Jan. 21, 1936.  R. H. ZINKIL  2,028,581
VALVE
Filed Oct. 4, 1934
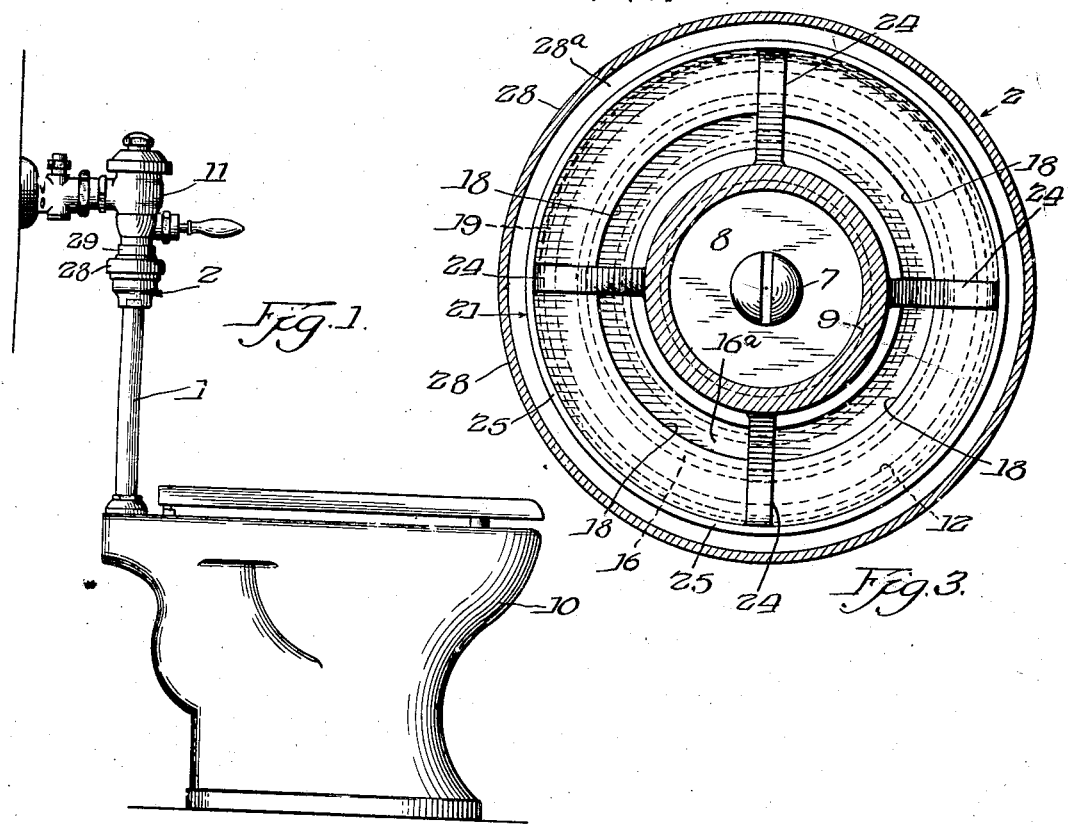
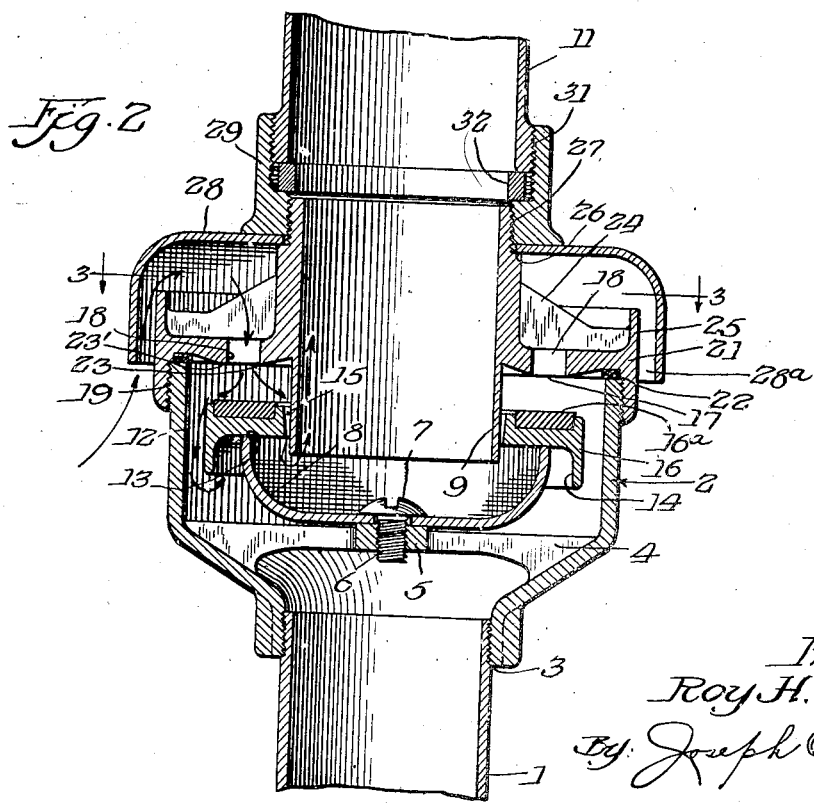
Inventor:
Roy H. Zinkil
By Joseph O. Lange
Atty.

Patented Jan. 21, 1936

2,028,581

UNITED STATES PATENT OFFICE 2,028,581

VALVE

Roy H. Zinkil, Oak Park, Ill., assignor to Crane Co., Chicago, Ill., a corporation of Illinois Application October 4, 1934, Serial No. 746,760

8 Claims. (Cl. 4—7)

One of the principal objects of this invention is to provide an adequate air vent to break a vacuum particularly when used in combination with water piping systems in which a vacuum is liable to occur because of line drainage, or breakage of a water main, or the like.

Another important object of my invention is to provide a valve in which the construction has means to prevent the full force of the vacuum created within the supply pipe acting upon the discharge pipe, which will subsequently be explained in more detail.

Another important object is to provide in a valve a means for holding back pressure produced at fixtures during normal operation, and to prevent what is termed "spitting", which results from the quick and sudden back flow through the device, thus causing line leakage outwardly into the atmosphere.

Another important object of my invention lies in the provision of a device which offers very low resistance to water flow within the pipe line and of symmetrical form in its preferred embodiment.

Another important object is that it is comparatively cheap to manufacture and easily accomplished without incurring expensive machining operations.

Another important advantage lies in the fact that the invention provides for a valve which is continuously open to atmosphere except when flushing. The device is usually installed on lines having intermittent flow, such as for water closets and the like, and the device is actuated by line flow during each flushing operation. In between such latter operations the construction of the device allows for the entry of air from atmosphere in a simple, positive, and effective manner.

Another important object is to provide a structure which indicates visually whether or not the device is actually performing properly for reasons subsequently outlined.

Another important object is that the positive means for preventing a vacuum cannot be destroyed, by the valve closure member remaining stationary. As previously stated, this is due to the air vents to atmosphere being normally wide open except when valve is flushing. Thus, if the valve closure member of my invention were to remain immovable, it would retard the flow of line fluid but it would not interfere with means for preventing or breaking the vacuum since a full opening to atmosphere would be maintained. The latter feature from the standpoint of guarding against contamination of the fresh water supply is of utmost importance and is the essence of this invention.

Another important advantage of my invention lies in the provision of a cover for the purpose of preventing or guarding against foreign matter entering or falling into the valve proper.

Another important object of my invention lies in the accomplishment of a disc or valve closure member which is designed to lift and seat with a very low rate of water flow; in other words, being very sensitive to line flow.

Another important object of my invention lies in the provision of a valve employing a unique seating arrangement, namely, to contact with the disc closure member at both its inner and outer periphery on one plane.

Another important object is to provide for a valve in which the body or casing of the structure has means for deflecting or changing the direction of the flow of water during the flushing operation and the disc or closure member is also designed in its preferred embodiment to change the direction of the flow of water so as to facilitate sensitivity in the valve operation. Similarly, the disc is provided with means for being suitably guided to maintain its position for proper actuation by a central or flushing tube extension.

Other important objects will be apparent upon the reading of the description in which Fig. 1 shows one of numerous ordinary installations in which the device of my invention identified by the numeral "2" is installed in the downstream or discharge side of the flushing valve 11, or any other similar water control means leading into a flushing or discharge pipe 1 for the purpose of flushing the bowl 10, or providing water similarly to any fixture.

Fig. 2 is a partial sectional assembly view showing a preferred embodiment of my invention.

Fig. 3 is a sectional view taken on the line 3—3 of Fig. 2, showing more clearly a plan of the venting or air port arrangement.

Referring to Fig. 1, the casing 2 is attached to the discharge pipe 1 by the threads 3, although it is obvious that any form of connection may be used in place of the threads. The casing 2 is provided with several diametrically extending ribs 4, which at their central point of intersection provide for a boss 5 threaded as at 6 to permit the use of a screw 7 or a rivet used in attaching a cup shaped member 8 sufficiently large to accommodate a projection of an inlet flow tube extension 9 and also to permit the member 8 to serve as a stop for the valve closure member 16, which preferably encircles the flow tube extension 9 and is guided thereby.

As shown in the drawing, the cup shaped member 8 is of approximately such proportions as to extend in between the space formed by the outside of the inlet flow tube extension 9 and the interior 12 of the casing 2.

Superposed upon the rim 13 of the cup shaped member 8, but not necessarily in leak-tight relation therewith, is the valve closure member 16 which may be of either a metal or a composition, or a combination of both, as shown. The valve closure member is preferably provided with a lower extending annular lip 14 which extends around the outside of and below the rim of the cup shaped member 8, the purpose of which is to serve as a means for deflecting of the flow of water downwardly rather than permitting it to strike the inner walls 12 of the casing 2, and thus interfere with the water flow. The disc 16 is guided around the inlet tubing extension piece 9 as indicated at 15, and preferably has an insert face member 16a to contact with the seat 17 when the valve closure member is actuated by the flow of line fluid in serving as a closure for the air inlet ports 18.

The casing 2 is preferably provided with threads 19 for attaching the bonnet 21, which is provided with a number of peripherally extending vents or air inlet ports 18. Interposed therebetween is a gasket 22 for the purpose of accomplishing a leak-tight joint between the bonnet and the casing.

Preferably made integral with the bonnet 21 is the previously described inlet flow tube extension 9, for the purpose above described, the port diameter of which is made approximately of the same proportions as the inside diameter of flow of the discharge tubing. The underside of bonnet 21 is provided with a seating surface 17 as previously referred to, and it is preferably made with two concentric circular seating contacts as indicated at 23 and 23¹, respectively. Between the peripheral extending air inlet ports 18 and assisting to contribute greater rigidity to the structure are the ribs 24, surrounded by the rim 25. The central portion of the bonnet 21 is provided at its upper portion with a shoulder 26 and threads 27. Superposed upon the bonnet 21 and resting upon the shoulder 26 is a cover 28, which is made of such proportions as to extend over and around the bonnet 21 so as to prevent the entry of foreign matter within the air inlet ports 18. Attached to the threads 27 is a connecting member 29 accomplishing the dual purpose of clamping the cover 28 firmly over the bonnet 21 and also providing by means of its threads 31 for a connection to a flushing valve or tubing or other device installed upon the pipe line, the gasket member 32 ordinarily serving as a means to make a tight joint between the flush control means 11 and the connection 29.

In describing a typical operation of my device, let it be assumed that the flushing valve 11 is intermittently flushing water to a closet bowl, which is a normal installation, and during such operation the water released is flowing downwardly thus creating back pressure in the device. The flow from the flushing valve 11 through the inlet flow tube extension 9 of the bonnet 21 continues downwardly into the cup shaped member 8. Instantaneously with the flow of line fluid within the cup shaped member 8, the valve closure member 16 is lifted thereby so as to contact at its face 16a with the seating surface 17 at the peripheral seating contacts 23 and 23¹, respectively, thus effectively preventing the flow of water outwardly into the atmosphere through the ports 18. The water continues to flow past the underside of the closure member 16, its path of deflection upwardly and outwardly being prevented by the downwardly extending lip 14. Thus the course of the water travel is changed so as to again proceed in a downward direction into the casing 2 and in between and past the ribs 4 downwardly into the port of the discharge tubing 1 for the purpose of flushing the fixture to which it is connected. If the valve closure member 16 is not operating properly so as to shut off the air vents 18 during the above described flushing operation, this condition will be indicated by the line fluid discharging out into the open through the clearance 28a. If for some reason the closure member were to remain in its normal position as shown in Fig. 2, it would retard the flow of fluid through the device, but it would not interfere with means for breaking the vacuum since a full opening to atmosphere would still be maintained.

Further, the rim 25 forms a receptor on top of the bonnet 21 in which any slight leakage past the valve seats 23 and 23¹ can accumulate and flow back into the valve casing 2 through the ports 18 at the end of the flush.

The foregoing description briefly explains the path of flow of water during operation of a water control device, as for example a flushing valve.

Let it now be assumed that the flow of water or fluid has ceased by reason of the flushing valve 11 having completed its cycle of operation. The valve closure member 16 will drop back to its normal position on the stop rim 13 by gravity and also because of the suction or pull caused by the evacuation of water from the flushing pipe 40 at the end of the flush, the closure member resting upon the rim 13 as shown in the drawing. Thus the ports 18 are opened and permit the air from the atmosphere to enter from the outside through the cover clearance 28a. Suppose further that instead of water or fluid pressure in the supply line a vacuum exists tending to reverse the direction of flow, in such instance the reversal of flow of water from the discharge pipe 1 is stopped by allowing a sufficient amount of air to enter as indicated by the path of arrows. The air travels in through the clearance 28a, under the cover 28, through the air vents 18, through the clearance 15, and into the tubular extension 9. It likewise travels as indicated, around the valve closure member 16, past the stop rim 13, into the discharge tubing 1.

It will be further apparent that the valve closure member 16 will be held against the stop rim 13 by the vacuum created, and thus will interfere with the full force of the vacuum in the supply pipe or extension tube 9 from acting upon any fluid in the discharge pipe 1.

It should be also noted that the areas at 13 and also at the clearance 15 are of such proportions that any suction occurring or any tendency to reverse flow is adequately offset by the larger areas through the ports 18 and the cover clearance 28a, respectively leading to atmosphere.

From the detailed description above given, it is evident that my invention is capable of employing numerous modifications coming within the spirit of my invention and further that any desired proportion of parts may be used. For example, a plurality of fluid inlets, outlets, or

I claim:

1. In a pressure actuated valve, a casing comprising in combination a fluid inlet, a fluid outlet, a vent opening to atmosphere, a valve closure member having means for directing the flow of fluid to said outlet, a cup-shaped member within said casing serving as a stop for said closure member and causing said closure member to restrict the back flow from the said outlet, said closure member closing the vent opening during the flow of fluid.

2. In a pressure actuated valve, a casing comprising in combination a fluid inlet, a fluid outlet, a vent opening to atmosphere, a valve closure member therefor having a multiple seating contact with the said vent opening, said closure member having means for directing the flow of fluid into said outlet and for closing the vent opening during the flow of fluid.

3. In a pressure actuated valve, a casing comprising in combination a fluid inlet, a fluid outlet, a vent opening to atmosphere, a valve closure member therefor having means for directing the flow of fluid to said outlet, the said closure member being movable in response to line flow in a direction different from the normal direction of said actuating flow, a bonnet superposed above said closure member, said bonnet providing the venting means and having a receptor for draining liquid accumulation into said casing.

4. In a pressure actuated valve, a casing comprising in combination a fluid inlet, a fluid outlet, a vent opening to atmosphere, a valve closure member having means for directing the flow of fluid to said outlet, the said closure member being movable in response to line flow in a direction opposite to the normal direction of said actuating flow, said vent opening having means for draining back flow into said casing, said valve closure member closing the vent opening during the flow of fluid.

5. In a pressure actuated valve, a casing comprising in combination a fluid inlet, a fluid outlet, a vent opening to atmosphere, a valve closure member therefor guided on its inner diameter, said closure member having an annular lip for directing the flow of fluid to said outlet, the said closure member being movable in response to line flow in a direction opposite to the normal direction of said actuating flow, said valve closure member closing the vent opening during flow of fluid.

6. In a pressure actuated valve, a casing comprising in combination a fluid inlet, a fluid outlet, a vent opening to atmosphere, a valve closure member therefor guided on its inner diameter, and being substantially in axial alignment with the inlet, outlet and vent openings, said closure member having an annular lip for directing the flow of fluid to the said outlet, said valve closure member closing the vent opening during flow of fluid.

7. In a pressure actuated valve, a casing comprising in combination a fluid inlet, a fluid outlet, a vent opening to atmosphere, a valve closure member therefor guided on its inner diameter, said closure member having means for directing the flow of fluid to the said outlet, a cup-shaped member within said casing serving as a stop for said closure member causing said closure member to restrict the back flow from the said outlet, the said closure member closing the vent opening during flow of fluid, and being movable in response to line flow in a direction opposite to the normal direction of said actuating flow.

8. In a pressure actuated valve, a casing comprising in combination a fluid inlet, a fluid outlet, a vent opening to atmosphere, a valve closure member therefor guided on its inner diameter, said closure member having an annular lip for directing the flow of fluid to the said outlet, the said closure member being actuated in response to line flow in a direction opposite to the normal direction of said actuating flow, a cup-shaped member supported within said casing serving as a stop for said closure member and causing said valve closure to restrict back flow from the said outlet and guiding the flow of fluid into the outlet in cooperation with said closure member, the latter closing the vent opening during flow of fluid.

ROY H. ZINKIL.